United States Patent [19]

Hart et al.

[11] 4,053,559

[45] Oct. 11, 1977

[54] PRODUCTION OF URANIUM DIOXIDE

[75] Inventors: James E. Hart, Columbia, S.C.; David L. Shuck, Littleton, Colo.; Ward L. Lyon, Monroeville, Pa.

[73] Assignee: Westinghouse Electric Corporation, Pittsburgh, Pa.

[21] Appl. No.: 695,346

[22] Filed: June 14, 1976

[51] Int. Cl.$^2$ .................. C01G 43/02; G21C 3/00
[52] U.S. Cl. ...................... 423/261; 252/301.1 R; 423/19; 423/253; 423/258
[58] Field of Search ............. 423/261, 19, 253, 258; 252/301.1 R, 301.15

[56] References Cited

U.S. PATENT DOCUMENTS

| | | | |
|---|---|---|---|
| 3,160,471 | 12/1964 | Knudsen et al. | 423/261 |
| 3,168,369 | 2/1965 | Reese et al. | 423/261 X |
| 3,174,834 | 3/1965 | Edwards et al. | 423/261 X |
| 3,547,598 | 12/1970 | Knudsen | 423/261 |
| 3,808,145 | 4/1974 | Packard et al. | 423/261 X |
| 3,941,870 | 3/1976 | Ekstrom et al. | 423/261 |
| 3,978,194 | 8/1976 | Knudsen et al. | 423/261 |

FOREIGN PATENT DOCUMENTS 1,281,501  7/1972  United Kingdom

Primary Examiner—Richard E. Schafer
Attorney, Agent, or Firm—R. T. Randig

[57] ABSTRACT

A continuous, four stage fluidized bed process for converting uranium hexafluoride ($UF_6$) to ceramic-grade uranium dioxide ($UO_2$) powder suitable for use in the manufacture of fuel pellets for nuclear reactors is disclosed. The process comprises the steps of first reacting $UF_6$ with steam in a first fluidized bed, preferably at about 550° C, to form solid intermediate reaction products $UO_2F_2$, $U_3O_8$ and an off-gas including hydrogen fluoride (HF). The solid intermediate reaction products are conveyed to a second fluidized bed reactor at which the mol fraction of HF is controlled at low levels in order to prevent the formation of uranium tetrafluoride ($UF_4$). The first intermediate reaction products are reacted in the second fluidized bed with steam and hydrogen at a temperature of about 630° C. The second intermediate reaction product including uranium dioxide ($UO_2$) is conveyed to a third fluidized bed reactor and reacted with additional steam and hydrogen at a temperature of about 650° C producing a reaction product consisting essentially of uranium dioxide having an oxygen-uranium ratio of about 2 and a low residual fluoride content. This product is then conveyed to a fourth fluidized bed wherein a mixture of air and preheated nitrogen is introduced in order to further reduce the fluoride content of the $UO_2$ and increase the oxygen-uranium ratio to about 2.25.

8 Claims, 3 Drawing Figures

PRODUCTION OF URANIUM DIOXIDE

BACKGROUND OF THE INVENTION

The process of the present invention relates generally to the manufacture of nuclear reactor fuels and more particularly to the production of ceramically active uranium dioxide powder ($UO_2$) from uranium hexafluoride ($UF_6$). The present invention utilizes four fluidized beds interconnected in series to provide substantially complete conversion of uranium hexafluoride to uranium dioxide.

DESCRIPTION OF THE PRIOR ART

One of the known methods for producing uranium dioxide is the so-called "wet" process of the type disclosed in U.S. Pat. No. 2,906,598, which primarily involves aqueous precipitation, filtration, drying, calcination and reduction steps. Attempts have been made to replace this involved and expensive wet conversion process through the use of fluidized bed reactors or the so-called "dry" process.

A one stage fluidized bed process is disclosed in U.S. Pat. No. 3,160,471 and a two stage process is disclosed in U.S. Pat. No. 3,547,598. These processes suffer from a common shortcoming due to the fact that the $UO_2$ powder so produced has a relatively high residual fluorine content which is undesirable because it adversely affects the sinterability of the powder. In addition, unless the residual value of fluorine remaining in the sintered fuel pellet is extremely low, it reduces the life of the cladding in which the fuel pellet is encased.

U.S. Pat. No. 3,235,327 discloses a two stage process which is dependent upon the use of relatively high volumes of nitrogen gas as a critical factor in the success of the disclosed process. The oxygen-uranium ratio is said to be between 2.00 to 2.02.

U.S. Pat. No. 3,168,369 discloses a gas phase reaction of $UF_6$ and steam in a first reactor to produce very fine $UO_2F_2$ powder. The resulting $UO_2F_2$ powder must then be reacted in a calciner with hydrogen and steam to produce $UO_2$ with nitrogen gas being introduced. The recovery of the fine $UO_2F_2$ powder of 0.1 micron size and finer is very difficult and requires multiple recovery systems in series.

French Pat. No. 2,060,242 discloses a one stage process wherein uranium hexafluoride is passed together with or countercurrent to water vapor between 150° C to 600° C. The water vapor may be diluted with an inert gas such as nitrogen. The resulting $UO_2F_2$ is treated with a mixture of air and water vapor to produce $U_3O_8$ or with a mixture of hydrogen and water vapor at above 500° C to produce $UO_2$.

SUMMARY OF THE INVENTION

The present invention is an improvement over the three stage process disclosed in U.S. Patent Application Ser. No. 376,847, filed July 5, 1973 and owned by the assignee of the present application. The process of the present invention provides a method of producing ceramicgrade uranium dioxide powder which possesses superior physical properties over the excellent powder produced by the process described in Application Ser. No. 376,847. The process described in that application utilizes three fluidized bed reactors in which hydrogen and steam are reacted with the uranium hexafluoride to produce $UO_2$ powder having a low residual fluorine content and an oxygen-uranium ratio of 2.05–2.07.

The process of the present invention reacts steam with uranium hexafluoride vapor in a first fluidized bed to form uranyl fluoride ($UO_2F_2$), then reacts steam and hydrogen with the uranyl fluoride in a second fluidized bed to produce uranium dioxide. The uranium dioxide is then treated in a third fluidized bed with additional steam and hydrogen to reduce the fluorine content to a very low level. The very pure uranium dioxide is finally treated with a controlled partial pressure of air in preheated nitrogen gas in a fourth fluidized bed reactor to further reduce the residual fluorine content and to render the product slightly hyperstoichiometric, i.e., having an oxygen-uranium ratio of about 2.25 ± .05.

One aspect of this invention resides in the step of controlling the mol fraction of hydrogen fluoride in the reactors in order to minimize or eliminate the formation of uranium tetrafluoride ($UF_4$) therein. $UF_4$ may be formed in the first reactor by direct reduction of the $UF_6$ by hydrogen or by a back fluorination reaction between the $UO_2$ and HF gas in the second reactor. The presence of $UF_4$ is undesirable for two reasons. First, because of its low melting point, $UF_4$ tends to sinter at relatively low temperatures within the second and third reactors causing poor sinterability of the $UO_2$. Secondly, the back fluorination between the $UO_2$ and HF gas forming the $UF_4$ necessitates further hydrolysis of the $UF_4$ back to $UO_2$ which requires additional time within the reactor vessels and therefore increases the overall residence time. We have found that by minimizing or eliminating the formation of $UF_4$, it is possible to reduce the residence time within the reactors to produce a $UO_2$ powder having a smaller mean particle size than the powder produced in the three stage process described in Ser. No. 371,847.

In addition, the process of the present invention includes a fourth fluidized bed in which the high purity $UO_2$ powder from the third reactor is treated with a mixture of air and preheated nitrogen to further reduce the fluoride level presumably by purging the powder of absorbed HF gas and by increasing the oxygen to uranium ratio from 2 to 2.25 ± .05. This increased oxygen-uranium ratio improves the fabricability and green strength of the pressed pellets and improves the sinterability thereof.

BRIEF DESCRIPTION OF THE DRAWINGS

For a better understanding of the invention, reference is made to the accompanying drawings in which.

DESCRIPTION OF THE PREFERRED EMBODIMENT

Figure 1:
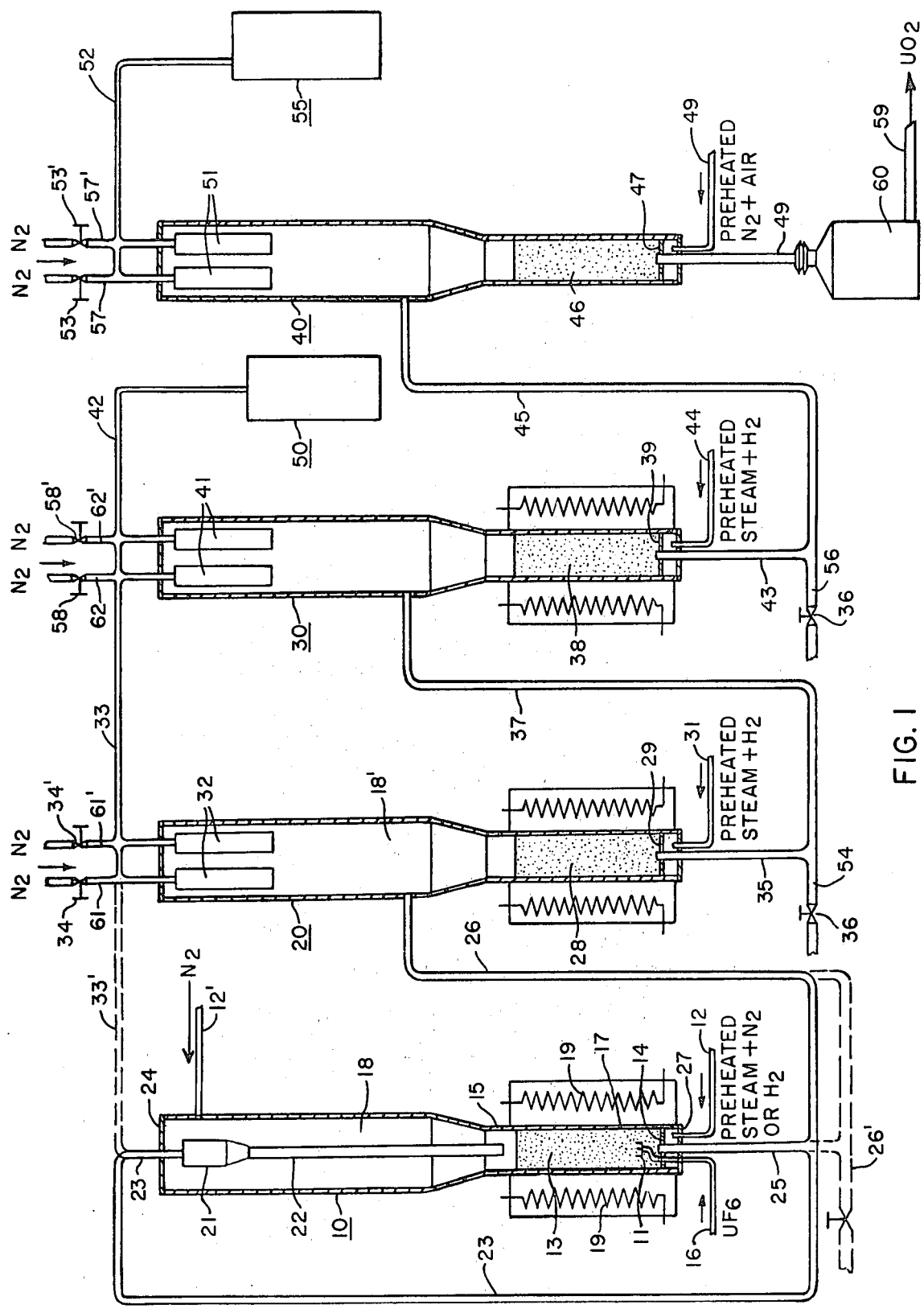
FIG. 1 is a schematic view partially in vertical cross-section of the four interconnected fluidized bed reactors used in practicing the invention.

As shown in FIG. 1, first, second, third and fourth fluidized bed reactors are generally designated 10, 20, 30 and 40, respectively. The reactors are interconnected by conduits 26, 37 and 45 for material transfer therebetween. The reactor vessels are hollow cylindrical shells arranged with their longitudinal axes being vertical. The reactor vessels 10, 20 and 30 are structurally similar, and, hence, only one need be explained in any detail. The primary or first reactor 10 consists of an upper portion 18 and a lower portion 17. Thermal insulation is preferably applied around the exterior of the reactors. The lower portion 17 is enclosed within heating means, such as electric resistance element 19. The upper end of reactor 10 is closed by a cover 24 and the lower end is closed by cover 27, which are detachably mounted in a manner not shown.

First reactor 10 has a conduit 12 for introducing preheated steam alone or mixed with either hydrogen or nitrogen at the lower end of portion 17. Similarly, second reactor 20 has an inlet conduit 31 for the introduction of preheated steam and hydrogen within said reactor and third reactor vessel 30 has an inlet conduit 44 also for introducing preheated steam and hydrogen into said vessel.

First reactor 10 is also provided with a conduit 16 extending through lower cover 27, having an inner end provided with a gas distributor nozzle 11 to introduce uranium hexafluoride ($UF_6$) into lower portion 17 of the reactor. Good results have also been obtained where the $UF_6$ gas is introduced through the sidewall of the reactor portion 17 and a single distributor nozzle is employed.

For initiating and maintaining the reactions within first fluidized bed reactor 10, a starting bed 13 composed of a mixture of particles of uranyl fluoride and uranium oxide is supported on a perforated bubble cap distributor plate 14. Bed 13 has an upper level when fluidized near the upper end of the lower reaction portion, as indicated at 15. A conduit 23 is positioned within the upper portion 18 of the first reactor for the collection of the offgases from the reactor. A cyclone separator 21 is also employed for separating coarser particles from the finer particles which are suspended in the off-gas. The coarser particles caught in the cyclone separator 21 drop down by gravity and are returned to reactor portion 17 through the conduit 22.

In one of the presently preferred embodiments shown in FIG. 1, the off-gases including hydrogen fluoride (HF) from first reactor 10 are carried by conduit 23 which meets conduit 25 at the bottom of the first reactor. Conduit 25 carries the first intermediate reaction products from reactor 10 and these are conveyed pneumatically by the off-gases through conduit 26 to second fluidized bed reactor 20. Alternatively, the off-gases from first reactor 10 may be diverted by conduit 33' shown in dashed line drawing directly to scrubber system 50 by way of conduits 33 and 42. In this embodiment, the solid intermediate reaction products from reactor 10 are conveyed by way of conduit 26', also shown in dashed lines, preferably by superheated steam to second reactor 20 by way of conduit 26.

In one form of the present invention, preheated steam and nitrogen are introduced into reactor 10 by way of conduit 12. Alternatively, preheated steam and hydrogen may be introduced into the reactor 10 by way of conduit 12, and in this case nitrogen is introduced in the top portion 18 of the reactor 10 by way of conduit 12'. The purpose of these various embodiments will be discussed in detail hereinafter.

Proceeding with the general description of the schematic layout of the process, second intermediate reaction products from reactor 20 leave the reactor by way of conduit 35 and are conveyed pneumatically preferably by steam via conduit 37 to the third fluidized bed reactor 30 wherein they are reacted with additional steam and hydrogen. The third intermediate reaction products leave reactor 30 by way of conduit 43 and are conveyed pneumatically preferably by nitrogen through conduit 45 to the fourth fluidized bed reactor 40. Reactor 40 need not employ heating elements around its lower portion as in the case of the previously described reactors 10, 20 and 30. The lower portion of the reactor surrounding fluidized bed 46 should preferably be insulated however. A mixture of preheated nitrogen and air is introduced into reactor 40 by way of conduit 48. The bed temperature in reactor 40 is controlled indirectly by controlling the temperatures of the carrier gas through conduit 45 and the fluidizing gas. The high purity $UO_2$ product produced in reactor 40 is transferred via conduit 49 by gravity into hopper 60 which preferably is wrapped with a cooling coil to cool the product prior to milling. The cooled product is then transferred pneumatically through conduit 59 to the milling system (not shown).

The off-gases from reactors 20 and 30 pass through internal filters 32 and 41, respectively, and are conveyed by way of conduit 33 and 42 to a suitable gas scrubber system including cooling means, dust collecting means and HF recovery means generally designated 50. Internal filters 32 and 41 are provided with a periodic blow back of nitrogen supplied by conduit 61, 61' 62 and 62' which are pulsed by way of solenoid valves 34, 34', 58 and 58'. This pulsing flow of nitrogen, at for example 60 psig, will dislodge any accumulated powder on the surfaces of filters 32 and 41. Fourth fluidized bed reactor 40 is, likewise, provided with internal filters 51 which transmit the off-gases therefrom by way of conduit 52 to a gas cooling and filter system 55. Internal filters 51 are also cleaned by way of pulsating nitrogen supplied by way of conduits 57 and 57', the flow of which is controlled by way of solenoid valves 53 and 53'. Reactor 40 preferably has its own off-gas collection system 55. The off-gases from reactors 10, 20 and 30 are high in hydrogen fluoride content whereas the off-gas from reactor 40 is substantially a mixture of nitrogen and air and it may merely be sent through collection system 55, rather than gas scrubber system 50.

Having described the general schematic layout of the apparatus employed in practicing the method of the present invention, a detailed description of the working of each reactor follows.

First Reactor

In first fluidized bed reactor 10 the predominant chemical reaction which takes place is:

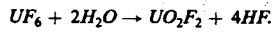
$UF_6 + 2H_2O \rightarrow UO_2F_2 + 4HF.$

The principal, first intermediate reaction product produced is uranyl fluoride ($UO_2F_2$) plus hydrogen fluoride gas (HF). Small amounts of $U_3O_8$ are also produced in first reactor 10, and the solid first intermediate reaction product is composed of about 95% $UO_2F_2$ and about 5% $U_3O_8$. The uranium hexafluoride gas ($UF_6$) is introduced into the first reactor 10 through nozzle 11 at approximately 100 lbs./hr. flow rate. For initiating the reaction, a starting bed 13 of a mixture of particulate uranyl fluoride and uranium oxide is supported on the perforated bubble cap distributor plate 78. The weight of bed 13 is controlled at about 220 pounds for a reactor diameter of 10 inches.

The temperature within the lower portion 17 of reactor 10 is maintained in the range of from approximately 475° C to 600° C in order to obtain a ceramically active $UO_2$ powder at the completion of the process. The optimum temperature range is between 535° C to 575° C and preferably about 550° C. For each mol of uranium contained in the uranium hexafluoride introduced into first reactor 10, from about 2 to 8 mols of steam are used. The steam is introduced into reactor 10 at temperatures of approximately 550° while the $UF_6$ gas may be introduced at about 80° C or by preheating it to a temperature of from about 100° C to 200° C. In order to reduce the number of large particles in bed 13, a jet attrition discharge nozzle (not shown) of from about 20 to 75 mils in diameter for a 10 inch diameter reactor bed introduces a stream of high pressure nitrogen, for example 10 to 70 psi, in order to break any large particles which might have been formed. The solid reaction products from reactor 10 continuously discharge from the bottom of the reactor by way of a solid flow control valve. The solid discharge is controlled by a bed weight controller which measures the pressure differential across the fluidized bed zone to maintain a nearly constant bed weight of about 220 pounds in the first reactor 10. The solid reaction product leaves the first reactor by way of conduit 25 and the particles have a sieve size ranging from about 10 to 1000 microns, preferably not exceeding 500 microns in diameter. The off-gases from the reactor 10 include a mixture of hydrogen fluoride and steam, together with some of the finer particles of the reaction products and these exit in the top portion of reactor 10.

It is one object of this invention to minimize or eliminate the formation of intermediate product uranium tetrafluoride ($UF_4$). $UF_4$ may be formed by direct reduction of $UF_6$ by hydrogen in the first reactor or by back reaction between $UO_2$ and HF gas in second reactor 20. We have determined that the presence of any small amount of $UF_4$ is undesirable because of its low melting point, its tendency to sinter and become sticky at relatively low temperatures within the second and third reactors, which leads to poor sinterability of the $UO_2$ and inherent process inconsistencies. It has also been determined that the back fluorination between $UO_2$ and HF forming $UF_4$, if eliminated from second reactor 20, leads to shorter residence times within the reactors. Conversely, the presence of $UF_4$ produced via fluorination of the $UO_2$ by the HF in the intermediate solid product tends to increase the in-process residence time required for fluoride removal and alters the structural characteristics of the final product. Specifically, the final product structure tends to move toward a larger mean particle size and a narrower size distribution as in-process residence time is increased for the purpose of fluoride removal.

Figure 2:
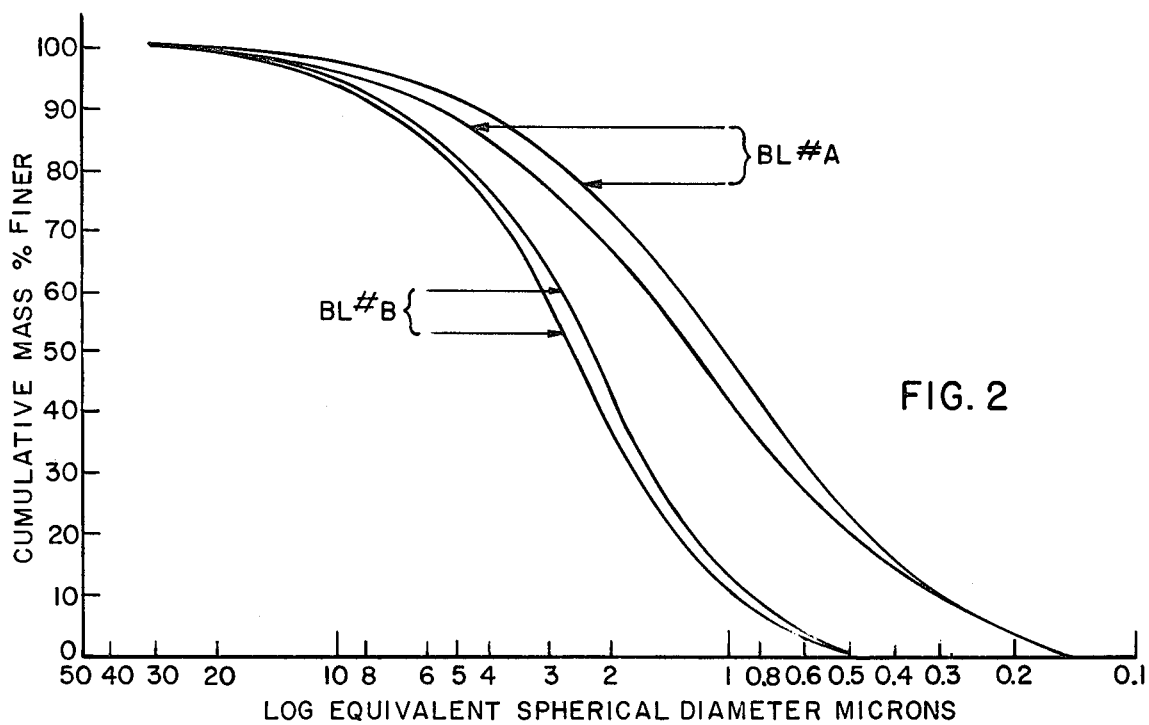
FIG. 2 graphically depicts the particle size distribution of the milled powder produced by the present invention and the powder produced by the three stage process described in application Ser. No. 376,847.

FIG. 2 is a plot comparing the particle size distribution of powder made from the process of the present invention identified as Blend A (BL #A) with the particle size distribution of powder made from the process described in Patent Application Ser. No. 376,847, identified as Blend B (BL #B). In making this comparative test, the reaction conditions were nearly identical in the three reactors 10, 20 and 30, except for the fact that hydrogen was eliminated in the first reactor in making Blend A and nitrogen was substituted therefor. Nitrogen was introduced in an amount of about 0.80 mols per mol of uranium. In the making of Blend B, hydrogen in the amount of 1.72 mols per mol of uranium was utilized in place of nitrogen in the first reactor. The process conditions are set forth in Table 1.

TABLE 1
PROCESS CONDITIONS

|  | BL #A | BL #B |
|---|---|---|
| First Reactor |  |  |
| Bed Temperature | 550° C | 550° C |
| $\frac{H_2O}{U}$ (mole ratio) | 5.57 ± .32 | 5.27 |
| $\frac{H_2}{U}$ (mole ratio) | Zero | 1.72 |
| $\frac{N_2}{U}$ (mole ratio) | 0.75 ± .21 | Zero |
| Residence (hrs) | 2.22 | 2.42 |
| 1st to 2nd Transfer: |  |  |
| Off Gas used | Yes | Yes |
| Additional $\frac{N_2}{U}$ | 1.82 ± .47 | 1.66 |
| Second Reactor |  |  |
| Bed Temperature | 630° C | 630° C |
| $\frac{H_2O}{U}$ (mole ratio) | 7.92 ± .24 | 8.76 |
| $\frac{H_2}{U}$ (mole ratio) | 2.11 ± .05 | 2.35 |
| Residence (hrs) | 5.24 | 5.69 |
| 2nd to 3rd Transfer: |  |  |
| $\frac{H_2O}{U}$ | 6.06 | 6.59 |
| Third Reactor |  |  |
| Bed Temperature | 650° C | 650° C |
| $\frac{H_2O}{U}$ (mole ratio) | 4.13 | 4.49 |
| $\frac{H_2}{U}$ (mole ratio) | 1.06 | 1.15 |
| Residence (hrs) | 5.25 | 5.71 |
| Total Residence (hrs) | 12.71 | 13.82 |

As noted from the above table, the residence time for the $UO_2$ powder of Blend A was 12.71 hours while the residence time for the powder produced in Blend B was 13.82 hours, a difference of over one hour. As can be seen in FIG. 2, the powder of Blend A possessed a smaller mean particle size than that of Blend B and also possessed a wider particle size distribution. The powder of Blend A possessed enhanced ceramic activity and sintered to a high density, meeting all pellet specifications as well as purity specifications with respect to residual fluoride contents.

Figure 3:
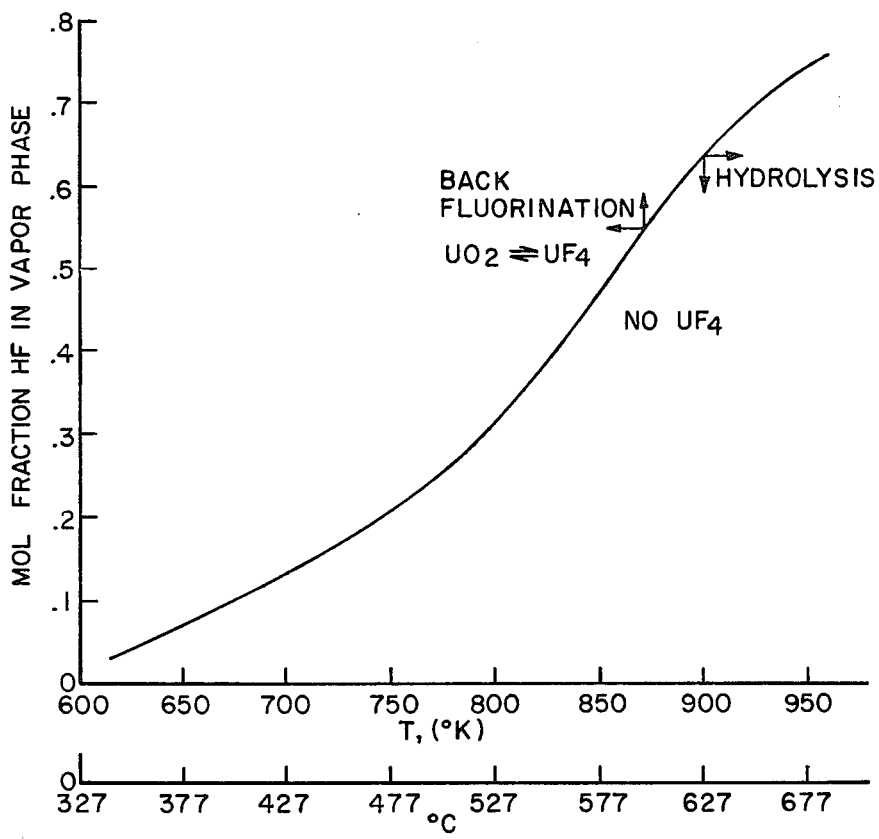
FIG. 3 is a curve plotting the mole fraction of hydrogen fluoride in a vapor phase of steam against temperature graphically depicting the equilibrium data for the intermediate fluorination reaction between $UO_2$ and HF.

In the above-described example, the first intermediate reaction products in solid form were pneumatically conveyed to second reactor 20 by way of conduit 26 using the off-gas from reactor 10 as the conveying medium. While the hot off-gases provide a convenient and efficient medium for solid transfer between the first and second fluidized bed reactors, we have determined that the hydrogen fluoride in the off-gases causes serious problems within second reactor vessel 20. $UO_2$ is formed within second reactor 20 and at certain temperatures and at certain mol fractions of HF a back fluorination reaction will occur producing unwanted $UF_4$. The conditions creating this back fluorination reaction are known in the art and they are graphically depicted in FIG. 3 wherein the mol fraction of hydrogen fluoride is plotted against temperature. The region above the curve of FIG. 3 represents the conditions at which the fluorination reaction occurs. The region below the curve is the area in which hydrolysis takes place. In order to prevent the back fluorination of $UO_2$ to $UF_4$, conditions within the second reactor should be controlled within the region below the curve of FIG. 3 and if the off-gas from reactor 10 is used as the transfer medium, the mol fraction of HF therein must be controlled within the region below the curve. This control step may be effected by the introduction of nitrogen into reactor 10 by way of conduit 12'. Nitrogen introduced into the first reactor by way of conduit 12' in an amount from about 0.5 to 5 mols per mol of uranium provides sufficient dilution of the HF within the off-gas to control the mol fraction of HF to below the curve of FIG. 3 within second reactor 20. The mol fraction of HF within the second reactor should be controlled below 0.7 and preferably below about 0.35. We have also found that by utilizing the $N_2$ into the top of reactor 10 that small amounts of hydrogen may also be introduced into first reactor 10 along with the preheated steam in conduit 12. Hydrogen in amounts of from about 1 to 8 mols of hydrogen per mol of uranium may be introduced by way of conduit 12. Some hydrogen flow within first reactor 10 is desirable since it tends to form a more stabilized bed than is the case when no hydrogen is used.

While the hot off-gas is a convenient transport medium, if diluted with sufficient nitrogen as described above, the problem of controlling the HF mol fraction within second reactor 20 may also be solved by diverting the off-gas from reactor 10 by way of conduit 33' directly to gas scrubber system 50. In this alternative embodiment the first solid intermediate reaction products are transported to second reactor 20 by way of conduit 26 using superheated steam as a transport medium supplied by way of conduit 26'. In this alternate preferred embodiment, the hydrogen fluoride mol fraction within second reactor 20 would be controlled at a very low level and the problem of back fluorination of $UO_2$ to $UF_4$ within reactor 20 would be eliminated since the operating conditions are well below the curve of FIG. 3.

Second Reactor

The first intermediate reaction products including solid particles of uranyl fluoride ($UO_2F_2$) and the oxide $U_3O_8$ continuously enter second reactor 20 by way of conduit 26. These first intermediate reaction products are reacted in the presence of additional steam and hydrogen within second reactor 20 to produce a second intermediate reaction product including uranium dioxide ($UO_2$). Second fluidized bed reactor 20 has a fluidized bed portion 28 which is controlled at a temperature within the range of from about 575° C to 675° C and preferably at about 630° C. In second reactor 20, the first intermediate products undergo further reaction and for that purpose for each mol of uranium present in the reactor about 4 to 12 mols of steam and about 1 to 6 mols of hydrogen are introduced through conduit 31. The preferred amounts of steam and hydrogen are 6 to 11 mols of steam and from 2 to 4 mols of hydrogen. Upon entering the second reactor 20, the particles of $UO_2F_2$ and $U_3O_8$ form the bed 28 distributed throughout the lower portion of the reactor in a manner similar to that of first reactor 10 and supported on a perforated bubble cap plate distributor 29. In the absence of $UF_6$ feed stock within reactor 20, better conditions exist to cause the reaction to proceed to completion. The first intermediate reaction products react with the steam and hydrogen to form uranium dioxide and hydrogen fluoride gas and water vapor with additional amounts of $UO_2F_2$ and $U_3O_8$. The second intermediate reaction products settle at the lower end of second reactor 20, then enter the outlet conduit 35 from where they are conveyed pneumatically to the third fluidized bed reactor 30 preferably conveyed via conduit 37 in a carrier medium such as superheated steam at about 650° C supplied by way of pipe 54 controlled by valve 36.

The off-gases from reactor 20, namely HF, $H_2$, $N_2$ and steam pass through internal filters 32 which provide for separation from the solid reaction products therefrom. From there the off-gases are transmitted through conduits 33 and 42 to the gas scrubber system 50. The second intermediate reaction product from reactor 20 consists of a fine particle $UO_2$ product with a residual fluoride content of up to about 0.50 weight percent compared with the first intermediate reaction product having a residual fluoride content of about 12%.

Third Reactor

The second intermediate reaction product from reactor 20 is conveyed pneumatically to third reactor 30 via conduit 37 utilizing superheated steam at about 650° C as the transfer medium. The third reactor receives the reaction products where in the presence of additional steam and hydrogen further reactions occur for the production of high purity $UO_2$ having a residual fluoride content of about 400 to 700 parts per million. The temperature within reactor 30 in the area of fluidized bed 38 is controlled within the range from about 575° C to about 675° C and preferably maintained at about 650° C. For each mol of uranium introduced into reactor 30 about 2 to 11 mols of steam and about 0.5 to 6 mols of hydrogen are introduced by way of conduit 44. Preferred amounts of steam and hydrogen are from 3 to 8 mols of steam and 1 to 3 mols of hydrogen per mol of uranium. The hydrogen and steam introduced in the lower portion of reactor 30 complete the defluorination of the $UO_2$ particles and the resulting hydrogen, hydrogen fluoride gas and steam comprising the off-gas leave reactor 30 through filters 41 from where they are conducted by way of conduit 42 to the off gas scrubber system 50. The third intermediate reaction product consists essentially of uranium dioxide ($UO_2$) having a very low residual fluoride content and a uranium content of about 87 to 88%. The oxygen-uranium ratio is about 2.04. The third intermediate reaction product is comparable in many respects to the final product produced in application Ser. No. 376,847 in purity, however, as pointed out in Table 1 and in FIG. 2, the milled product of the present invention has a finer average particle size compared to that of the process described in Application Ser. No. 376,847.

The third intermediate reaction product leaves reactor 30 by way of conduit 43 from where it is pneumatically conveyed through conduit 45 to fourth fluidized bed reactor 40. The pneumatic transfer medium is preferably preheated nitrogen at about a temperature of 400° C which is supplied through conduit 56, the flow rate of which is controlled by valve 36'.

Fourth Reactor

The third intermediate reaction product consisting essentially of high purity $UO_2$ is received in the fourth fluidized bed reactor 40 wherein the oxygen-uranium ratio is increased from approximately 2.04 to 2.25 ± 0.05 in a heated nitrogen and air atmosphere. A mixture of preheated nitrogen at about 300° C and air at ambient temperature enters reactor 40 by way of conduit 48 and passes upwardly through distributor plate 47 to fluidize the bed 46. A controlled oxidation of the $UO_2$ is achieved by controlling the air flow rate and the fluidized bed temperature. The bed temperature is controlled indirectly by controlling the carrier gas and the fluidizing gas temperatures; the carrier gas being the $N_2$ gas entering reactor 40 by way of conduit 45. Preferably, about 3 to 7 mols of nitrogen per mole of uranium is introduced through conduit 45 along with about 0.2–1.0 mols of air per mol of uranium. Not only does the fourth reactor 40 increase the oxygen-uranium ratio, but it also further reduces the residual fluoride content by about 10%, presumably by purging the $UO_2$ powder of absorbed HF gas. The off-gas from reactor 40 consisting essentially of a mixture of nitrogen and air at about a temperature of 150° C pass through internal filters 51 and through conduit 52 to a cooler and dust collector system having high efficiency filters, generally designated 55. Internal filters 51 are cleaned periodically with a blow back of nitrogen through conduits 57 and 57' controlled by solenoid valves 53 and 53'. The high purity $UO_2$ product settles by gravity through conduit 49 into vessel 60 which is preferably wrapped with a cooling coil to cool the product prior to milling. The cooled product is conveyed from vessel 60 pneumatically through conduit 59 and fed into a milling apparatus (not shown).

The $UO_2$ powder produced in this four stage process owing to the small particle size and the oxygen-uranium ratio of about 2.2–2.3 provides improved fabricability in the pellet pressing process and improved sinterability and low distortion. The process produces powder of high ceramic activity to yield consistently high quality pellets suitable for use in nuclear reactors.

The following example is illustrative of the present invention.

EXAMPLE

The four reactor fluidized bed system as described above was run with a $UF_6$ flow rate of 100 lbs./hr. The operating conditions and product characteristics are listed below. The $UO_2$ powder and the subsequent pellets produced therefrom met all of the product specifications required for the production of high quality nuclear fuel pellets.

The powder produced in the run set forth in Table 2 was subjected to a complete chemical analysis, the results of which are set forth in Table 3 below.

TABLE 3

| POWDER ANALYSIS | |
|---|---|
| Uranium Content | 87.04% (weight%) |
| O/U ratio 2.205 | |
| Moisture Content | 0.06% |
| Impurity Content | |
| Element | Analysis - PPM (Ave. of four samples) |
| Al | <10 |
| B | <.3 |
| C | 23.25 |
| Ca | <10 |
| Cd | <.3 |
| Cr | 4.1 |
| Cu | 1 |
| F | 326.25 |
| Fe | <12.25 |
| In | <.575 |
| Mg | <.5 |
| Mn | <1 |
| Mo | <.5 |
| N | <10 |
| Ni | <8.6 |
| Pd | <.65 |
| Si | <10 |
| Sn | <.55 |
| Ti | <1 |
| V | <.5 |
| W | <.44 |
| Zn | <1 |

This $UO_2$ powder was then milled and pressed into pellet form and sintered in $H_2$ using standard processing techniques. Of the 82 individual samples checked, the final sintered densities were in the range of 94.16% to 95.13% theoretical density which is considered acceptable for use as a fuel pellet in nuclear reactors. The sintered pellets where further subjected to chemical analysis and the results are set forth in Table 4 below.

TABLE 2

| | $UF_6$ (lbs/hr) | $H_2O$/U ratio | $H_2$/U ratio | $N_2$/U ratio | OFF-GAS (Mols/hr) | Reaction Product (lbs/hr) |
|---|---|---|---|---|---|---|
| First Reactor (550° C) (10 inch dia.) | 100 | 5.39 | 1.69 | 1.88 | .95 $H_2O$ .475 $H_2$ 1.17 HF .535 $N_2$ | 82.7 $UO_2F_2$ 4.4 $U_3O_8$ |
| Temp. (° C) | 150° | 550° | 550° | Amb. | 250° | 550° |
| Pressure (PSIG) | 40 | | 8($H_2O$ + $H_2$) | 3 | 3 | — |
| Flow Rate (cfm) | .71 | | 23.5 ($H_2O$ + $H_2$) | 2.9 | 29.8 | 87.1 lbs/hr |
| | | | (OFF-GAS TRANSFER) | | | |
| Second Reactor (630° C) (10 inch dia.) | | 8.06 | 2.08 | — | 3.14 $H_2O$ .91 $H_2$ 1.68 HF .630 $N_2$ | 5.14 $UO_2F_2$ 44.9 $U_3O_8$ 29.0 $UO_2$ |
| Temp. (° C) | | 630° | 630° | | 275° | 630° |
| Pressure (PSIG) | | | 10($H_2$ + $H_2$) | | 1 | — |
| Flow Rate (cfm) | | | 33.9 ($H_2O$ + $H_2$) | | 71.5 | 79.1 lbs/hr |
| | | | (STEAM TRANSFER AT 650° C) | | | |
| Third Reactor (650° C) (10 inch dia.) | | 4.12 | 1.0 | | 3.00 $H_2O$ .162 $H_2$ .0334 HF .058 $N_2$ | 76.7 $UO_2$ |
| Temp. (° C) | | 650° | 650° | | 220° | 650° |
| Pressure (PSIG) | | | 9($H_2O$ + $H_2$) | | 1 | — |
| Flow Rate (cfm) | | | 18.3($H_2O$ + $H_2$) | | 32.9 | 76.7 lbs/hr |
| | | (NITROGEN TRANSFER AT 400° C) | | | | |
| | | Air/U | $N_2$/U | | | |
| Fourth Reactor (300° C) | | .7 | 5.25 | | 3.28 $N_2$ 0.016 Air | 77.8 $UO_2$ |
| Temp. (° C) | | 300° | ($N_2$ + Air) | | 150° | 300° |
| Pressure (PSIG) | | 3 | ($N_2$ + Air) | | 0 | — |
| Flow Rate (cfm) | | 17.6 | ($N_2$ + Air) | | 31.0 | 77.8 lbs/hr |

TABLE 4
PELLET ANALYSIS

| | |
|---|---|
| Uranium Content | 88.17 (weight%) |
| Equivalent Moisture Content | 6.76 ppm |
| O/U ratio | 1.997 |
| Impurity Content Element | Pellet Analysis - PPM |
| Al | <10 |
| B | <0.3 |
| Bi | <0.3 |
| C | <10 |
| Ca | <10 |
| Cd | <0.3 |
| Co | <0.5 |
| Cr | 5.8 |
| Cu | <1.0 |
| F | <10 |
| Fe | <10 |
| In | <0.5 |
| Mg | <0.5 |
| Mn | <1.0 |
| Mo | <0.7 |
| N | 17 |
| Ni | <5.0 |
| Pd | <0.5 |
| Si | <10 |
| Sn | <0.5 |
| Ti | <1.0 |
| Th | <1.0 |
| V | <0.5 |
| W | <10 |
| Zn | <1.0 |

Hence, the method of the present invention provides a four stage continuous process which, by minimizing or eliminating the formation of $UF_4$, decreases the residence time within the system resulting in a finer particle size $UO_2$ product having a O/U ratio of about 2.2–2.3 with enhanced ceramic activity and uniform high quality.

What is claimed is:

1. A continuous process for converting uranium hexafluoride ($UF_6$) to ceramic-grade uranium oxide product having a low residual fluoride content, comprising the steps of:
   a. establishing and maintaining in contact with a first fluidized bed a mixture consisting essentially of uranium hexafluoride ($UF_6$) and steam ($H_2O$) the proportion of from about in 2 to 8 mols of steam per mol of uranium;
   b. concurrently heating the first fluidized bed to a temperature within the range from about 475° C to about 600° C to produce a first intermediate reaction product including solid particles of uranyl fluoride ($UO_2F_2$) and the oxide $U_3O_8$ and an off-gas including hydrogen fluoride (HF);
   c. conveying the first solid intermediate reaction product to a second fluidized bed reactor;
   d. controlling the mole fraction of hydrogen fluoride in the second reactor to minimize the formation of uranium tetrafluoride $UF_4$;
   e. maintaining the second fluidized bed comprising a mixture of the first solid intermediate reaction product and additional steam and hydrogen in the proportions of from about 4 to 12 mols of steam and from about 1 to 6 mols of hydrogen per mol of uranium;
   f. concurrently heating the second fluidized bed to a temperature within the range from about 575° C to about 675° C to produce a second intermediate reaction product including uranium dioxide ($UO_2$);
   g. conveying the second intermediate reaction product to a third fluidized bed;
   h. maintaining the third fluidized bed comprising a mixture of the second intermediate reaction product and additional steam and hydrogen in the proportions of from about 2 to 11 mols of steam and from about 0.5 to 6 mols of hydrogen per mol of uranium;
   i. concurrently heating the third fluidized bed to a temperature within the range from about 575° C to about 675° C to produce a third intermediate reaction product consisting essentially of uranium dioxide ($UO_2$) having an oxygen-uranium ratio of about 2 and a low residual fluoride content;
   j. conveying the third intermediate reaction product to a fourth fluidized bed; and
   k. maintaining the fourth fluidized bed comprising the third intermediate reaction product and a mixture of air and nitrogen to further reduce the fluoride content and increase the oxygen-uranium ratio to about 2.2 to about 2.3 to produce ceramic-grade uranium oxide product suitable for use in the manufacture of fuel pellets for nuclear reactors.

2. The process of claim 1 wherein the solid intermediate reaction product including the uranyl fluoride ($UO_2F_2$) is conveyed from the first fluidized bed reactor to the second fluidized bed reactor using the off-gas from the first reactor including the hydrogen fluoride (HF) as a transport medium, the mol fraction of hydrogen fluoride in the second reactor being controlled to a value of less than about 0.35 by introducing nitrogen ($N_2$) into the first reactor in an amount of from about 0.5 to 5 mols of nitrogen per mol of uranium.

3. The process of claim 1 including the step of adding hydrogen ($H_2$) and nitrogen ($N_2$) to the first fluidized bed reactor in the proportions of from about 1 to 8 mols of hydrogen and from about 0.5 to 5 mols of nitrogen per mol of uranium.

4. The process of claim 1 wherein the mol fraction of hydrogen fluoride in the second reactor is controlled at a low level by diverting the off-gas from the first reactor to a gas scrubber system and conveying the first solid intermediate reaction product from the first reactor to the second reactor using steam as a transport medium.

5. The process of claim 4 including the step of adding hydrogen ($H_2$) to the first fluidized bed reactor in an amount of from about 1 to 8 mols of hydrogen per mol of uranium.

6. A continuous process for converting uranium hexafluoride ($UF_6$) to ceramic-grade uranium dioxide ($UO_2$) having low residual fluoride content, comprising the steps of:
   a. establishing and maintaining in contact with a first fluidized bed a mixture cnsisting essentially of uranium hexafluoride, steam ($H_2O$) and hydrogen ($H_2$) in the proportions of from about 2 to 8 mols of steam and from about 1 to 8 mols of hydrogen per mol of uranium;
   b. concurrently heating the first fluidized bed to a temperature within the range from about 475° C to about 600° C to produce a first intermediate reaction product including solid uranyl fluoride ($UO_2F_2$) and an off-gas including hydrogen fluoride (HF);
   c. diverting the off-gas from the first reactor including the hydrogen fluoride to a gas scrubber system and conveying the solid intermediate reaction product including the uranyl fluoride to a second fluidized bed reactor using steam as a transport medium;
   d. maintaining the second fluidized bed comprising a mixture of the uranyl fluoride and additional steam and hydrogen in the proportions of from about 4 to 12 mols of steam and from about 1 to 6 mols of hydrogen per mol of uranium;

e. concurrently heating the second fluidized bed to a temperature within the range from about 575° C to about 675° C to produce a second intermediate reaction product including uranium dioxide ($UO_2$);

f. conveying the second intermediate reaction product to a third fluidized bed;

g. maintaining the third fluidized bed comprising a mixture of the second intermediate reaction product and additional steam and hydrogen in the proportions of from about 2 to 11 mols of steam and from 0.5 to 6 mols of hydrogen per mol of uranium;

h. concurrently heating the third fluidized bed to a temperature within the range from about 575° C to about 675° C to produce a third intermediate reaction product consisting essentially of uranium dioxide ($UO_2$) having an oxygen-uranium ratio of about 2 in a low residual fluoride content;

i. conveying the third intermediate reaction product to a fourth fluidized bed; and j. maintaining the fourth fluidized bed comprising the third intermediate reaction product and a mixture of air and nitrogen to further reduce the fluoride content and increase the oxygen-uranium ratio to about 2.25 to produce ceramic-grade uranium dioxide suitable for use in the manufacture of fuel pellets for nuclear reactors.

7. The process of claim 6 wherein the first fluidized bed reactor is heated to a temperature of about 550° C, the second fluidized bed reactor is heated to about 630° C, the third fluidized bed reactor is heated to about 650° C and wherein the nitrogen introduced into the fourth fluidized bed reactor is preheated to a temperature of about 300° C.

8. The process of claim 6 wherein the second intermediate reaction product is conveyed from the second fluidized bed reactor to the third fluidized bed reactor using steam as a transport medium and the third intermediate reaction product is transported from the third fluidized bed reactor to the fourth fluidized bed reactor using nitrogen as a transport medium.

* * * * *